No. 703,544. Patented July 1, 1902.
P. B. CLARKE.
ROTARY WEIGHING MACHINE.
(Application filed Apr. 27, 1901.)
(No Model.) 6 Sheets—Sheet 2.

FIG.2.

Witnesses
PEETE B. CLARKE, Inventor.
BY C. A. Snow & Co.
Attorneys

No. 703,544. Patented July 1, 1902.
P. B. CLARKE.
ROTARY WEIGHING MACHINE.
(Application filed Apr. 27, 1901.)

(No Model.) 6 Sheets—Sheet 4.

FIG. 4.

Witnesses  PEETE B. CLARKE, Inventor,
BY
Attorneys

No. 703,544. Patented July 1, 1902.
P. B. CLARKE.
ROTARY WEIGHING MACHINE.
(Application filed Apr. 27, 1901.)
(No Model.) 6 Sheets—Sheet 5.

Witnesses
J. Frank Culverwell.
H. H. Riley.

PEETE B. CLARKE, Inventor.
BY C. A. Snow & Co.
Attorneys

No. 703,544. Patented July 1, 1902.
P. B. CLARKE.
ROTARY WEIGHING MACHINE.
(Application filed Apr. 27, 1901.)
(No Model.) 6 Sheets—Sheet 6.

Witnesses
PEETE B. CLARKE, Inventor
BY C. A. Snow & Co.
Attorneys

UNITED STATES PATENT OFFICE.

PEETE B. CLARKE, OF NEW YORK, N. Y.

ROTARY WEIGHING-MACHINE.

SPECIFICATION forming part of Letters Patent No. 703,544, dated July 1, 1902.

Application filed April 27, 1901. Serial No. 57,808. (No model.)

*To all whom it may concern:*

Be it known that I, PEETE B. CLARKE, a citizen of the United States, residing at New York, in the county of New York and State of New York, have invented a new and useful Rotary Weighing-Machine, of which the following is a specification.

The invention relates to improvements in rotary weighing-machines.

The object of the present invention is to improve the construction of weighing-machines, more especially that shown and described in the application filed by me May 26, 1898, Serial No. 681,788, and to increase the efficiency of the same and to enable the cut-off to be arranged close to the rotary weighing receptacle or cylinder, whereby the accuracy of the weighing-machine is increased.

A further object of the invention is to provide simple, inexpensive, and efficient means for automatically operating the cut-off to open the same, lock it in its open position, and trip it when the rotary weighing receptacle or cylinder has received its full charge.

A further object of the invention is to improve the construction of the supplemental weights for imposing directly on the rotary load receiver or cylinder an additional weight when the poising-point is reached for imparting an additional downward impetus to the same to insure a positive operation of the cut-off-controlling mechanism.

The invention also has for its object to improve the construction for checking the rotation of the weighing receptacle or cylinder after it has discharged its load and for stopping it in proper position to receive another charge of material.

The invention consists in the construction and novel combination and arrangement of parts hereinafter fully described, illustrated in the accompanying drawings, and pointed out in the claims hereto appended.

In the drawings.

Like numerals of reference designate corresponding parts in all the figures of the drawings.

1 designates a rotary load-receiver or cylinder mounted on a horizontal shaft 2 and subdivided by radial partitions 3 into buckets or compartments for the reception of the material to be weighed, and the said load-receiver or cylinder is adapted to turn freely on the said shaft 2 to discharge its contents, and it is provided at opposite sides with suitable bushings or bearings 4. The horizontal shaft 2, which extends entirely through the center of the load-receiver or cylinder, also passes through vertical slots 5 of vertical standards or guides 6 of a supporting-frame, and it is housed within a central transverse casing formed by slightly-curved plates 7, which are secured around the shaft and which preferably consist of extensions of the radial partitions; but they may be constructed in any other suitable manner if desired.

Figure 4:
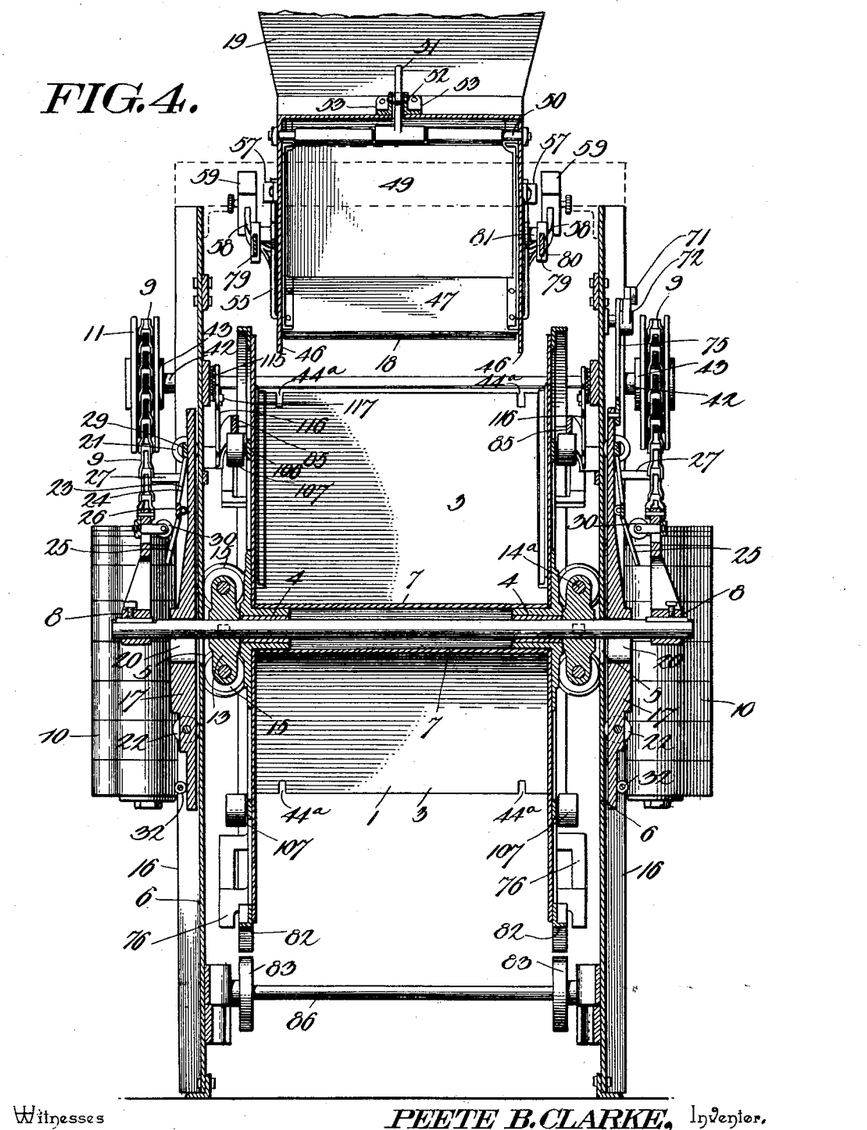
Fig. 4 is a transverse sectional view.

The ends of the horizontal shaft are secured in circular apertures of hangers 8 by set-screws or other suitable fastening devices, and they are preferably keyed to the hangers, which are provided with slots or openings located above the circular apertures and enabling ready access to be had to the set-screws. The hangers, which are located on the exterior of the supporting-frame, are secured at their upper ends to chains 9, forming flexible connections between the load-receiver or cylinder and scale-weights 10, and passing over guide-pulleys 11 and sprocket-wheels 12, located at opposite sides of the supporting-frame. The chain is of the sprocket variety, and it meshes with the sprocket-wheel, and it is connected at its rear end by any suitable device with the means for supporting the scale-weights, which are designed to be removable, as indicated in the accompanying drawings, to be arranged for weighing different charges of material. The horizonal transverse shaft is also keyed to a pair of bearing-blocks 13, interposed between the sides of the load-receiver or cylinder and provided with central openings for the horizontal shaft and having upper and lower bearings 14, receiving short shafts or rods 14ª, upon which are mounted upper and lower guide-wheels 15, provided with peripheral flanges and arranged to run on the vertical standards 6, as clearly illustrated in Figs. 1 and 4 of the drawings, to enable the vertical movement of the rotary load-receiver or cylinder to be frictionless. The shafts or rods 14ª are preferably provided at their ends with nuts; but any other suitable means may be provided for retaining the guide-wheels on the ends of the said short shafts or rods 14ª. The rotary load-receiver is capable of a limited vertical movement, as hereinafter explained, and the vertical slots 5 of the uprights or standards 6 of the supporting-frame permit the horizontal transverse shaft 2 to move vertically.

The supporting-frame may be of any desired construction, and the uprights or standards 6, which preferably consist of channel-iron beams or pieces, are provided with parallel side flanges 16 and receive supplemental weights 17, which operate similar to the supplemental weights of the application before referred to and serve for partially counterbalancing the scale-weights during the first portion of the weighing operation and for imposing directly on the load-receiver or cylinder an additional weight when the poising-point is reached to impart an additional impetus to the load-receiver or cylinder to cause the same to move downward positively and quickly and to effect a positive operation of the mechanism hereinafter described for controlling a cut-off 18 of a supply-chute 19. The supplemental weights are located at opposite sides of the supporting-frame similar to those of the said application, and each weight, which is provided with a slot 20 to receive the transverse shaft 2, has upper and lower antifriction rollers or wheels 21 and 22, mounted in suitable openings of the said supplemental weight and projecting inward and rearward therefrom and arranged to run on the adjacent vertical upright or standard. During the first portion of the weighing operation and while the material, such as coal, is discharging into one of the buckets of the rotary load-receiver or cylinder the supplemental weights are resting upon the ends of the transverse shaft 2, and thereby partially counterbalance the scale-weights which are attached to the rear ends of the chains or other flexible connections. If the scale-weights equal five hundred pounds and the supplemental weights aggregate one hundred pounds, a charge of four hundred pounds will counterbalance the scale-weights, and the rotary load-receiver or cylinder upon receiving a slight excess of four hundred pounds will move downward under the influence of the partial charge and the supplemental weights a short distance in the same manner as the supplemental weights of the weighing-machine of the said application. After the slight downward movement of the load-receiver or cylinder has taken place the supplemental weights are supported by a pair of spring-actuated catches 23, whereby the rotary load-receiver or cylinder will be relieved of the effect of the said supplemental weights and will be operated on or influenced by the scale-weights, so that a full five-hundred-pound charge of coal or other material will be necessary to counterbalance the scale-weights. As soon as the rotary load-receiver or receptacle has received its full charge and the poising-point is reached it will begin to descend and the supplemental weights will be tripped and will fall upon the ends of the transverse shaft, so that an additional one hundred pounds will be applied to the rotary load-receiver or receptacle to cause the same to descend quickly and positively and to cause a positive and accurate operation of the cut-off-controlling mechanism hereinafter described, so that the cut-off will be closed when the load-receiver or receptacle has received its full charge to prevent an excess of material falling into the bucket.

The spring-actuated catch consists of a lever having upper and lower arms 24 and 25 and laterally-extending fulcrum-arms 26, provided at their terminals with perforated ears extending from the arms 26 at right angles to the same and pivoted to the flanges of the standards or uprights 6 of the supporting-frame. The lever is also provided with an upper laterally-extending arm 27, projecting beyond the standard or upright 6 and connected with a coiled spring 28, which is secured to a suitable support and which is adapted to draw the upper portion of the catch inward to hold the same in position for engaging a lug or projection 29 of the upper portion of the supplemental weight. The lower portion or arm of the catch is arranged at an angle and extends downward and outward and is adapted to be engaged by an antifriction-wheel 30, mounted in a suitable bearing or support of the hanger 8 and projecting from the inner or rear face thereof, as clearly illustrated in Fig. 4 of the accompanying drawings. When the rotary load-receiver or cylinder moves downward under the influence of a complete charge of material, the antifriction wheels or rollers 30 force the lower portions of the spring-actuated catches inward and carry their upper engaging portions outward away from the lugs of the supplemental weights, and the support being thus withdrawn from the supplemental weights the latter will fall and affect the load-receiver or cylinder, as before explained. The upper engaging portions of the catches are arranged at an angle or inclination, and when the supplemental weights are carried upward by the scale-weights after the load-receiver or cylinder has emptied its charge the lugs 29 will readily pass the engaging ends of the catches, and the coiled springs will return and hold the said catches in position for reëngaging the said lugs 29. The supplemental weights have thin upper and lower portions and are engaged by lower antifriction devices 32, consisting of collars or wheels mounted on the inner faces of the longitudinal side flanges of the standards or uprights 6 and adapted to retain the supplemental weights in position between the said flanges and at the same time to permit the supplemental weights to move frictionlessly.

Figure 20:
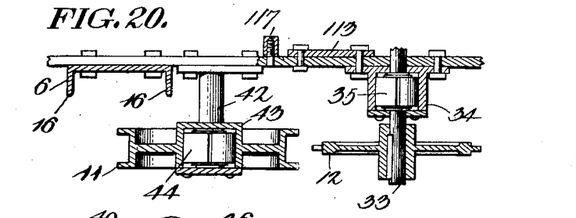
Fig. 20 is a detail horizontal sectional view illustrating the manner of mounting the pulleys and sprocket-wheels.
Figure 21:
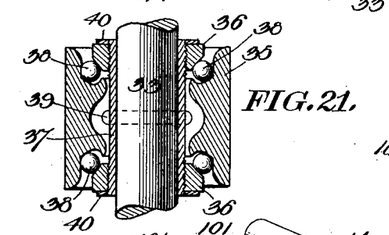
Fig. 21 is a detail sectional view illustrating the construction of the ball-bearings for the pulleys and sprocket-wheels.

The chain or sprocket wheel 12 is mounted on a transverse shaft 33, which rotates with the chain or sprocket wheel and which is mounted within ball-bearings consisting of a cylindrical casing 34, an outer bearing-sleeve 35, and inner bearing rings or collars 36, connected by a sleeve 37 and having two series of antifriction-balls 38 interposed between them and the outer bearing-sleeve. The inner connecting-sleeve has threaded ends, and the bearing collars or rings, which form cones, are interiorly threaded and engage the ends of the connecting-sleeve. The outer bearing-sleeve is provided at its ends with grooves forming ball-races for the reception of the antifriction-balls, and it is hollowed out at its center to provide a space for the ends of the key 39 for securing the connecting-sleeve to the shaft. The ends of the connecting-sleeve are also provided with washers 40, of felt or other suitable material, arranged as clearly shown in Fig. 21. The outer casing 34, which is provided with a suitable cap or cover, is secured to the supporting-frame, as clearly indicated in Fig. 20 of the accompanying drawings, and the said outer sleeve 35 is held stationary in the outer casing by means of a suitable feather or key; but any other means may be employed for effecting this result. The pulley or sheave 11, which is grooved at its periphery to receive the chain, rotates freely on a stub-shaft 42 and is provided with a ball-bearing constructed substantially the same as that just explained. The hub 43 of the pulley or sheave constitutes the outer casing and is provided at its outer face with a removable plate or cover, and a bearing-sleeve 44 is keyed or otherwise secured within the hub. This bearing-sleeve is constructed substantially the same as the said bearing-sleeve 35, and the other parts of the bearing are the same as the corresponding parts of the bearing for the shaft of the chain or sprocket wheel.

The supply-chute 19, which is mounted on the upper portion of the supporting-frame, is located directly above and its sides depend slightly within the load-receiver or cylinder, the partitions 3 of the latter being provided with slots 44ª, located at the outer edges of the partitions and arranged to receive the depending portions 46 of the sides of the supply-chute. By this construction the chute is enabled to be extended into the load-receiver or cylinder without interfering with the rotation thereof in order to bring the cutter 18 as close as possible to the material within the said load-receiver or cylinder, so that there will be no material in the air between the cut-off and the load-receiver or cylinder when the latter has received its full charge. The material will either be within the loaded bucket or within the chute above the cut-off, so that there will be no material that will pass through the weighing-machine without actually being weighed. When the load-receiver or cylinder is free to rotate, the center of gravity of the charge being in advance of the transverse shaft 2 will cause a very rapid movement of the said load-receiver or cylinder on the said shaft. The bottom or back 47 of the supply-chute is slightly inclined, and the said back or bottom 47 and the front 48 converge toward the bottom or lower end of the chute, and the discharge-opening of the chute may be varied in size by a hinged plate 49 to regulate the flow of the material. The plate 49 depends from a shaft or pintle 50, which is provided with a centrally-arranged arm 51, having an upper handle portion or grip and provided with a perforation adapted to receive a pin or key 52 for securing the said arm 51 at the desired adjustment between a pair of segmental plates 53. The segmental plates 53, which are mounted on the exterior of the front 48 of the chute, are provided at intervals with perforations for the reception of the pin or key, whereby the adjustable plate may be held at any point.

The cut-off 18, which is arranged at the lower end of the supply-chute, is slightly curved and is adapted to oscillate backward and forward to open and close it, and it is provided at its back with a pair of upwardly-extending arms 55, located at opposite sides of the cut-off and connected with the sides of the chute by means of pivots 56. The pivots 56 are supported by suitable plates or brackets 57, and the side arms are provided between their ends with upwardly-extending weighted arms 58, having adjustable weights 59, adapted to be moved inward and outward to increase the leverage to provide the necessary force for positively and rapidly closing the cut-off when the same is tripped by the means hereinafter described. The side arms and the rearwardly-extending arms 59 form approximately T-shaped levers for mounting the cut-off and the actuating-weights.

The cut-off is provided at its back with a centrally-arranged lug 60, beveled at its rear face and having a shoulder at its front face adapted to be engaged by a catch 61, having a beveled tooth or head for engaging the said lug. The beveled lug is adapted to engage automatically the head or tooth of the catch 61 when the cut-off is opened by the means hereinafter described, and the said catch 61, which is arranged at an inclination in rear of the supply-chute, is pivoted at its upper end between ears 62 of a bracket 63, mounted on a suitable support and provided with an arm 64, arranged to support the catch in position for enabling the same to be automatically engaged by the lug. The bracket 63 consists of a bar bent at an angle to form the arm 64 and to provide the body portion of the bracket, which is inclined upward and rearward. The arm of the bracket, which extends forward, is suitably secured to a transverse bar or support which is located at the upper portion of the supporting-frame in rear of the supply-chute, as clearly illustrated in Figs. 1 and 3 of the accompanying drawings.

Figure 1:
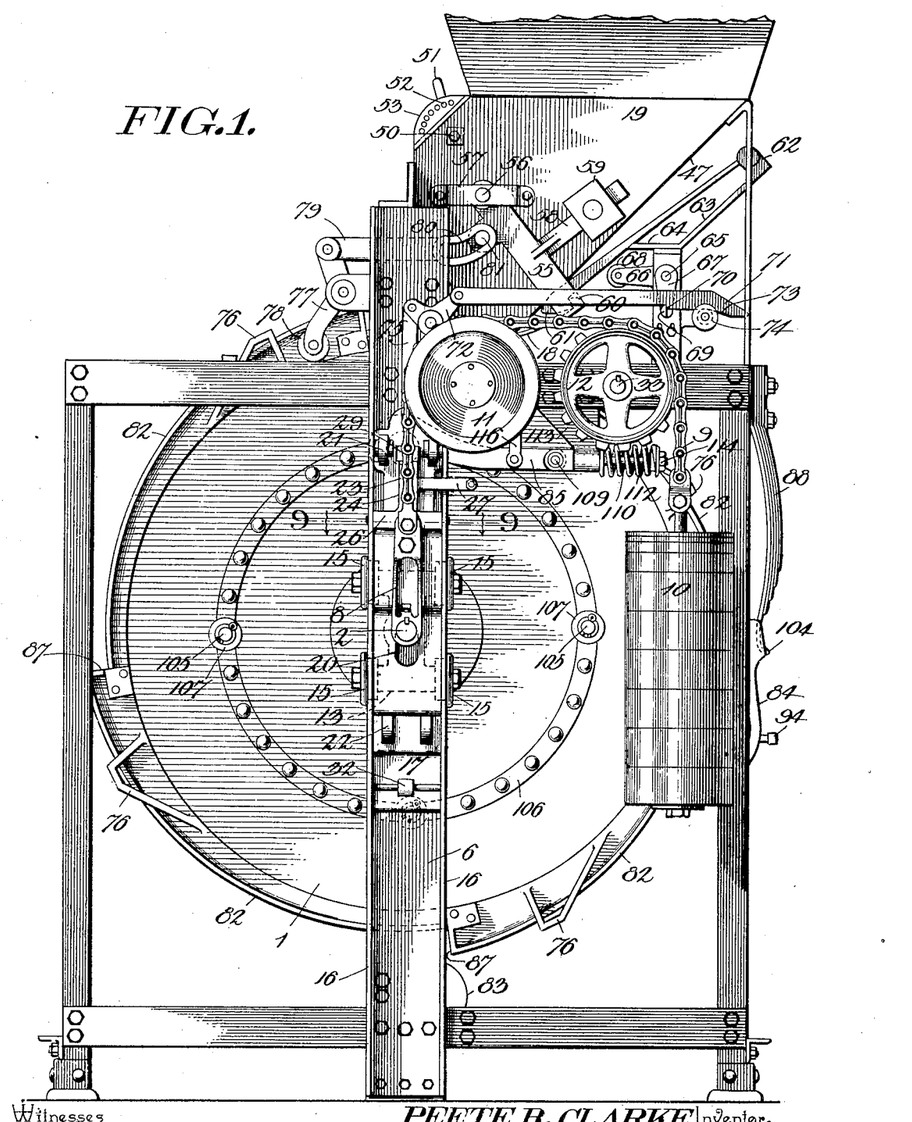
Figure 1 is a side elevation of a rotary weighing-machine constructed in accordance with this invention.
Figures 5, 6, 7, 8, 9, 10, 11, 12:
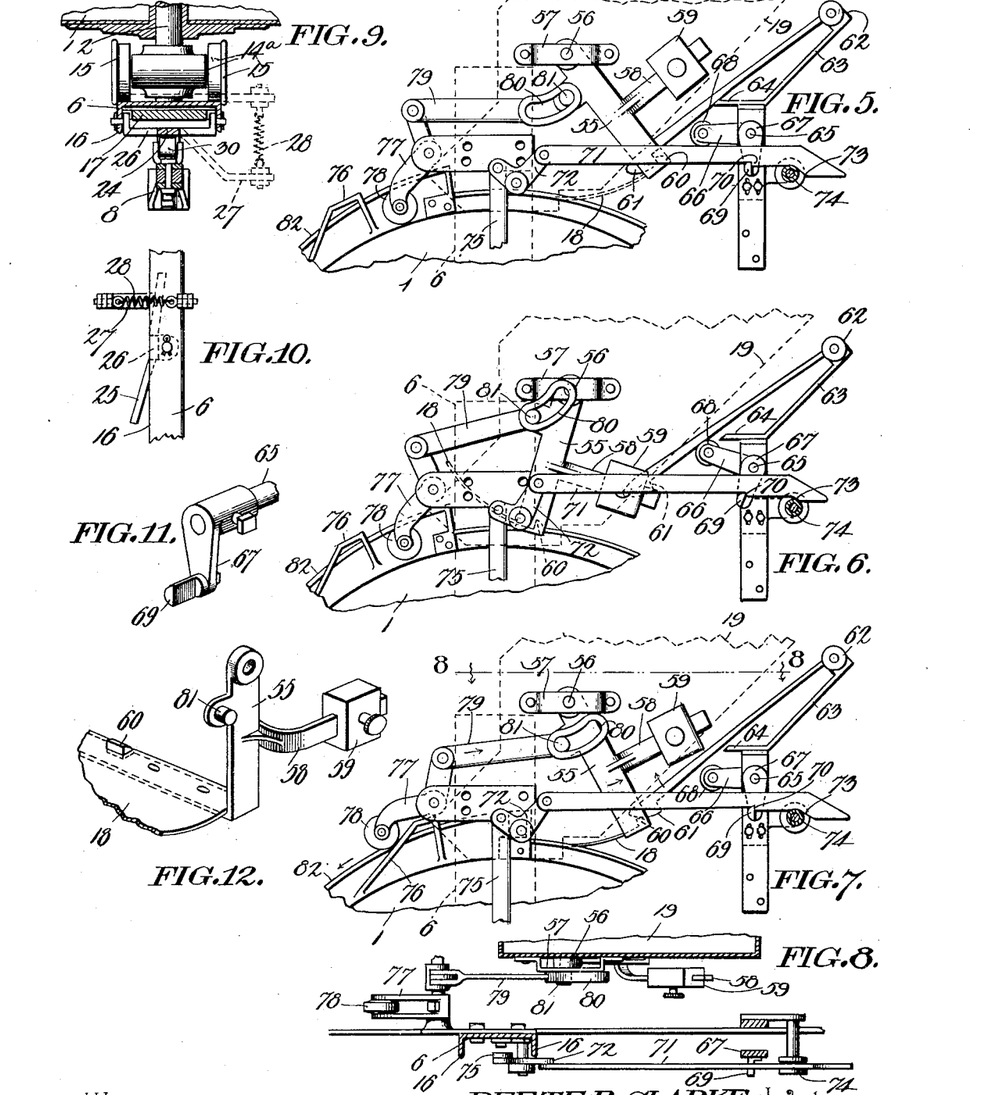
Figs. 5, 6, and 7 are detail views illustrating the construction of the cut-off-controlling mechanism and showing the same in different positions.
Fig. 8 is a sectional view on the line 8 8 of Fig. 7.
Fig. 9 is a detail sectional view on the line 9 9 of Fig. 1.
Fig. 10 is a detail view illustrating the manner of mounting the spring for actuating the catch for supporting the supplemental weight.
Fig. 11 is a detail view of the outer arm of the bell-crank lever for releasing the cut-off.
Fig. 12 is a detail view illustrating the construction of the weighted arm for closing the cut-off when the latter is tripped.
Figure 13:
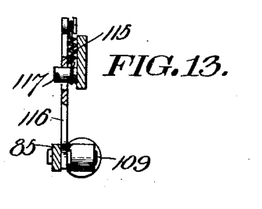
Figs. 13, 14, and 15 are detail views illustrating the construction of the combined stop and buffer for limiting the rotation of the load-receiver.

The catch is swung upward to release the cut-off when the load-receiver or cylinder moves downward under the influence of a full charge of material by means of a bell-crank consisting of a shaft 65, disposed transversely of the supporting-frame and provided with an inner centrally-arranged arm 66 and an outer arm 67, arranged at right angles to the inner arm 66 and extending downward from the shaft in a vertical position, as clearly illustrated in Fig. 1 of the accompanying drawings, when the cut-off is open. The inner arm 66 is provided with an antifriction-wheel 68, arranged to engage the lower or rear face of the catch to avoid wearing the same and adapted to swing the said catch upward out of engagement with the lug of the cut-off, whereby the latter is tripped to permit the weighted arms to close it automatically. The outer depending arm of the shaft 65 is provided with a horizontal stud 69, cut away at one side, as clearly illustrated in Fig. 11 of the accompanying drawings, to form a shoulder or straight face to be engaged by a shoulder 70 of a substantially horizontal bar 71, connected at its front end with one arm of a bell-crank 72 and having an inclined rear end 73, presenting a lower inclined edge arranged to ride upward upon a grooved antifriction-wheel 74 when it is drawn forward, whereby after it has rocked the shaft 65 and tripped the cut-off it will be carried upward out of engagement with the outer depending arm 67 to release the latter and the catch 61 to allow the latter to return to its initial or normal position for engaging the cut-off as soon as the latter is opened by the means hereinafter described. The other arm of the bell-crank lever 72 is connected by a vertical link or bar 75 with the adjacent supplemental weight, whereby when the rotary load-receiver or cylinder moves downward under the influence of a charge of material and the supplemental weight is tripped the bar 71 will be drawn forward to throw the catch 61 out of engagement with the cut-off. The cut-off-controlling mechanism may, if desired, be duplicated and arranged at each side of the weighing-machine instead of only at one side, as shown in the accompanying drawings. The antifriction-wheel 73 is mounted on a suitable bracket, which is secured to the supporting-frame, as clearly shown in Figs. 1 and 5.

The rotary cylinder or load-receiver is provided at its periphery with lugs 76, arranged at intervals and corresponding with the buckets and having inclined faces adapted to engage levers 77, fulcrumed between their ends at the upper portion of the supporting-frame and having upper and lower arms, the lower arms being provided with antifriction wheels or rollers 78, arranged in the paths of the lugs and adapted to be engaged by the same, whereby the said levers 77 are oscillated to open the cut-off. The upper arms of the levers are connected with the front ends of approximately horizontal bars having curved rear portions provided with curved openings 80, receiving projections 81 of the side arms of the cut-off. The projections of the side arms of the cut-off are arranged at the rear ends of the openings or slots of the bars 79 when the cut-off is open, as illustrated in Fig. 1 of the accompanying drawings, and when the cut-off is tripped the projections of the side arms are free to move in the slots 80 and are located at the front ends thereof when the cut-off is closed, as clearly shown in Fig. 6. When the lower ends of the levers 77 are engaged by the lugs 76, the bars 79 are moved rearward and they carry with them the cut-off, as clearly indicated in Fig. 7 of the drawings. The cut-off is engaged by the catch 61 before the lugs 76 leave the lower ends of the levers 77, and when the lugs 76 pass the levers 77 the latter return automatically to their initial or normal position.

The lugs 76, which may be constructed in any suitable manner, are preferably formed integral with eccentrically-arranged cams 82, located at the periphery of the load-receiver or cylinder at opposite sides thereof and adapted to run on lower wheels 83 to give the load-receiver or cylinder an upward impetus and arranged to be engaged by brakes 84 to check the rotation of the load-receiver or cylinder as the same nears the end of its movement to prevent the load-receiver or cylinder contacting with a combined stop and buffer 85 with too great a force. The wheels 83, which are arranged at the bottom of the supporting-frame, are mounted upon a suitable transverse shaft or axle 86, and they are located at opposite sides of the supporting-frame in substantially the same planes as the sides of the load-receiver or cylinder. The eccentrically-arranged cams also form shoulders 87, arranged to abut against the said brake after the cams have passed the same to check any retrograde rotation of the load-receiver or cylinder induced by the contact of the same with the stops or buffers 85.

Figure 2:
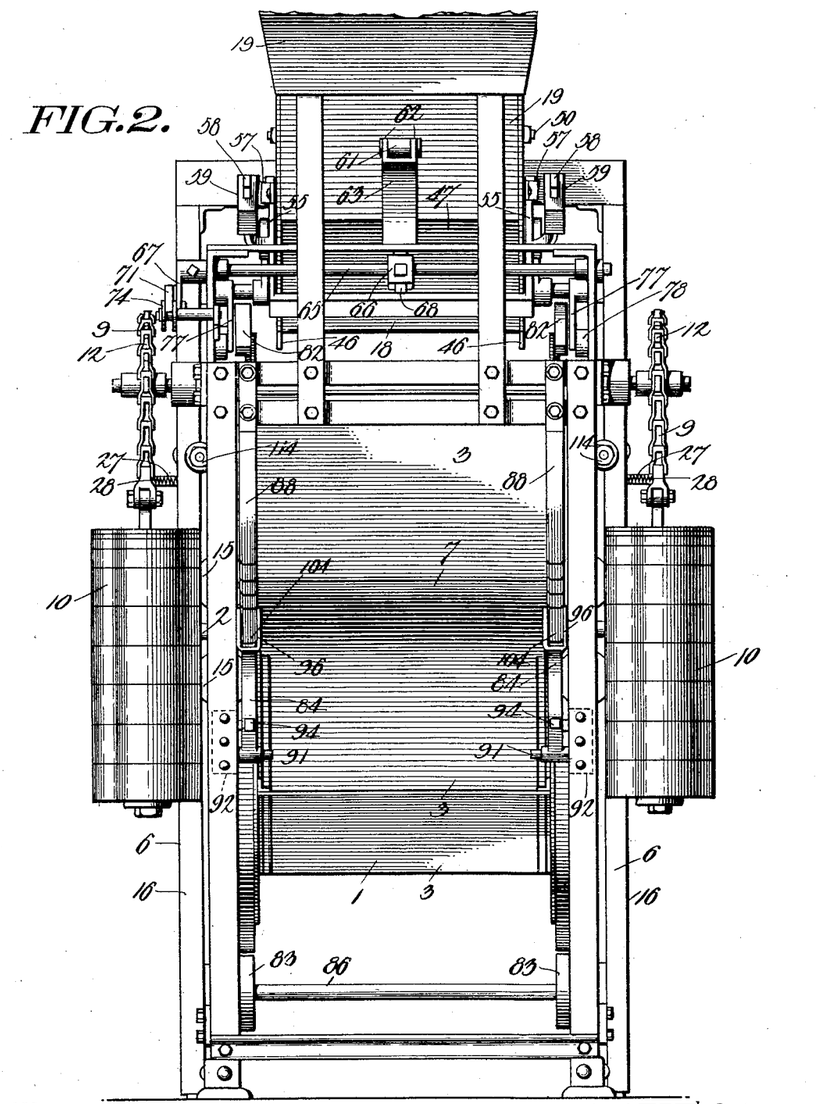
Fig. 2 is an end elevation of the same.
Figure 3:
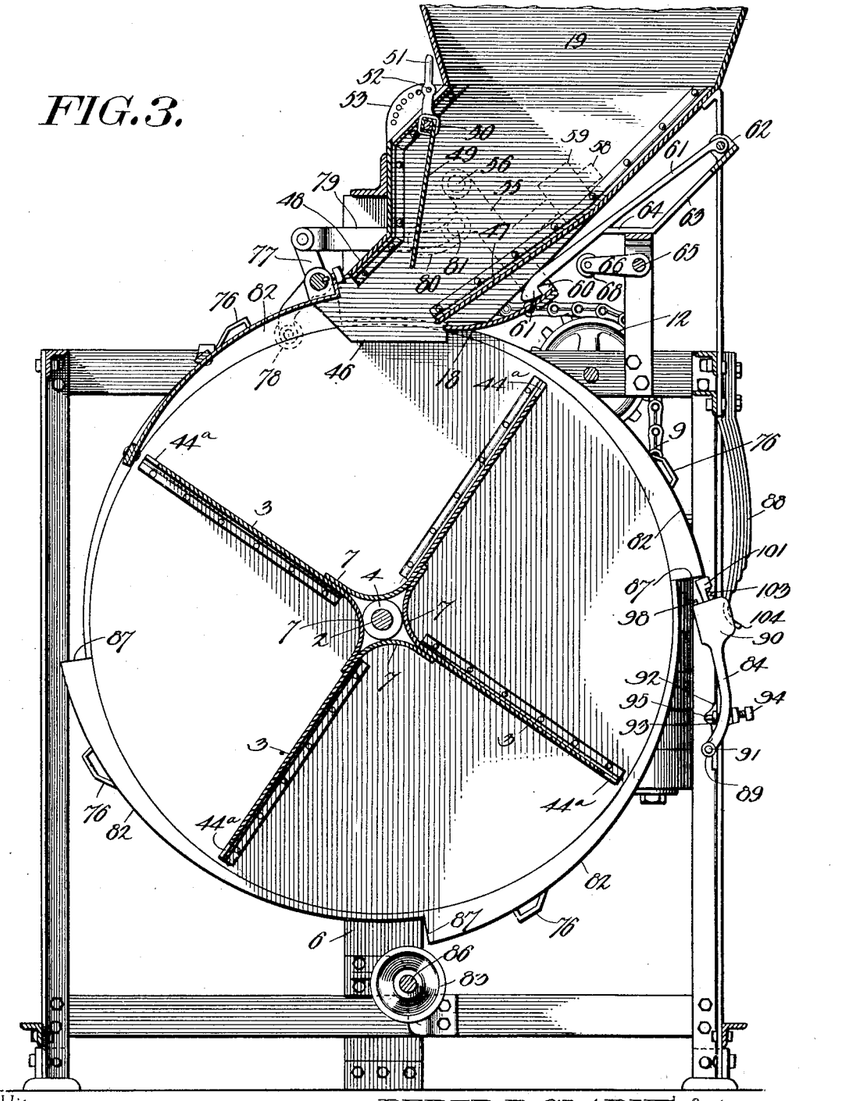
Fig. 3 is a vertical longitudinal sectional view.
Figures 15, 16, 17, 18, 19, 22, 23, 24, 25, 26:
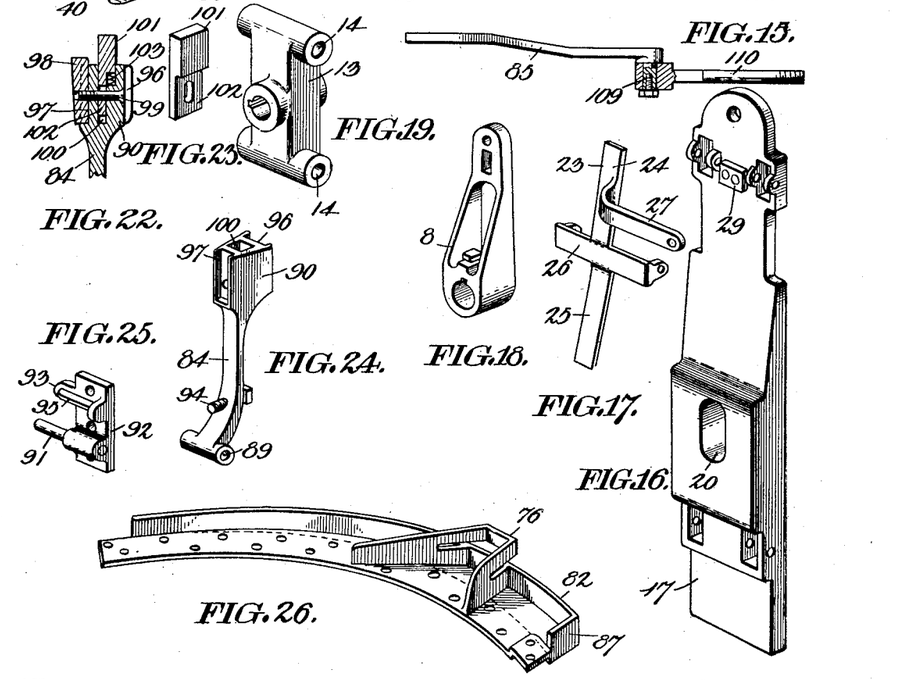
Fig. 16 is a detail view of one of the supplemental weights.
Fig. 17 is a detail view of the spring-actuated catch for engaging and supporting the supplemental weight.
Fig. 18 is a detail view of one of the hangers in which the shaft of the load-receiver is journaled.
Fig. 19 is a detail perspective view of one of the bearing-blocks for supporting the guide-wheels of the load-receiver.
Figs. 22, 23, and 24 are detail views illustrating the construction of the combined brake and stop.
Fig. 25 is a detail view of the bracket upon which the combined stop and brake is mounted.
Fig. 26 is a detail view of one of the eccentrically-arranged cams.

The brakes are located at opposite sides of the supporting-frame at the back thereof, and each brake, which is pivotally mounted at its lower end, is disposed in an upright position and is engaged at its top by a leaf-spring 88 and consists of a slightly-curved shank or bar provided at its lower end with an eye or bearing 89 and having a head 90 at its upper end. The eye or bearing 89 is detachably arranged on a horizontal pivot 91, extending laterally from the lower portion of a bracket or plate 92, which is suitably mounted on the supporting-frame at the back thereof, as clearly indicated in Figs. 2 and 3 of the accompanying drawings. The bracket or plate 92 is provided with a laterally-projecting lug 93, arranged above the pivot and adapted to form an abutment for an adjusting-screw 94, which limits the inward movement of the brake and the consequent engagement of the latter with the peripheral cams of the load-receiver or cylinder. The lug is reinforced by a rib 95, which extends across the upper portion of the bracket or plate 92, and the outer face of the head 90 of the brake is provided with side flanges, forming an intervening space or recess 96, receiving the lower end of the leaf-spring 88, whereby the brake is detachably held on the pivot 91 of the bracket or plate 92. The inner or rear face of the head 90 of the brake is provided with a recess 97 for the reception of a detachable wear-plate 98, which is adapted to be engaged by the cams 82 and which is adapted to be readily renewed when worn. The removable wear-plate is provided with a threaded opening and is engaged by a screw 99, which extends approximately horizontally through the head and which has its head arranged at the outer face of the brake. The head of the brake is also provided with a central socket 100, located between the inner and outer recesses 96 and 97 and receiving a cushioned stop or buffer 101, arranged within the socket 100 and projecting beyond the brake and adapted, as illustrated in Fig. 3 of the accompanying drawings, to be engaged by the shoulders of the cams to check any retrograde rotation of the load-receiver or cylinder. The socket 100 has a reduced lower portion, and the buffer 101 has a reduced slotted shank 102, and the shoulder formed by reducing the shank is engaged by a spiral spring 103, located within the socket and interposed between the shoulder of the buffer and a shoulder of the said socket, as clearly shown in Fig. 22. The screw 99 passes through the slot of the buffer 101 and limits the movement thereof. The brake has its upper portion slightly inclined, and the leaf-spring 88, which is secured at its upper end to the upper portion of the supporting-frame, has its lower end 104 slightly curved and arranged in the outer recess 96 of the brake. The leaf-spring 88 forces the brake inward toward the load-receiver or cylinder, and the adjusting-screw limits the inward movement of the brake.

Figure 14:
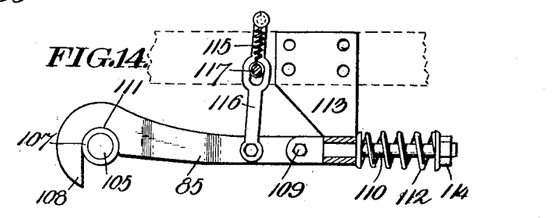

The load-receiver or cylinder is provided at opposite sides with suitable projections 105, corresponding with the buckets of the said receiver or cylinder and preferably formed integral with rings 106, riveted or otherwise secured to the sides of the load-receiver or cylinder, as clearly shown in Fig. 1. The projections are preferably provided with antifriction sleeves or rollers 107, retained on the projections by split keys or pins and arranged to be successively engaged by the combined stop and buffer 85. The combined stop and buffer 85 consists of an approximately hook-shaped bar having a depending bill or head 108 and pivoted at 109 to a shank or rod 110. The bill or head 108 is located at a recess 111, arranged to receive the projections 105, as clearly shown in Fig. 14 of the drawings. The projections are carried upward at the back of the weighing-machine, and their antifriction sleeves or rollers engage the combined stop and buffer in rear of the recess 111 and slightly raise the same and finally engage the bill or head 108. If the forward rotation of the load-receiver or cylinder is not checked by the time that the stops 105 arrive at the bill or head 108, the shock or jar caused by such contact will be taken up by a coiled spring 112, mounted on the rod 110 and interposed between a bracket 113 and a suitable stop at the outer end of the rod. The bracket which depends from the upper portion of the supporting-frame is provided with an opening to receive the shank or rod 110, and the spring preferably bears against washers arranged against the bracket and against a nut 114. The rod 110 is capable of longitudinal movement to permit the spring to act as a cushion, and the front or body portion of the stop is adapted to swing upward on the pivot 109. The recess 111 is substantially semicircular to conform to the configuration of the antifriction sleeve or roller, and it is adapted to hold the load-receiver or cylinder against movement in either direction. The pivoted front portion or bar of the combined stop and buffer 85 is forced downward by a coiled spring 115, connected with the upper end of a link 116 and with a screw 117, arranged in a slot of the link 116; but any other suitable form of fastening device may be employed. The link or bar 116 is pivoted at its lower end to the bar or body portion of the combined stop and buffer 85, and the said coiled spring 115 draws the link or bar 116 downward after the pivoted hook-shaped bar has been raised by one of the projections 105 and the latter has reached the recess 111.

Should the weight of the material in the loaded bucket not produce a rapid forward rotation of the load-receiver, this will be effected by the buffers at the rear brakes, as the downward movement of the load-receiver will carry the rear cams against the buffers and the latter will force the load-receiver forward. The downward movement of the load-receiver is substantially frictionless, owing to the ball-bearings of the chain wheels and pulleys and the carriages, which are formed by the blocks 13 and the wheels 15.

The auxiliary weights act simultaneously, and the load-receiver moves upward and downward uniformly at both sides, as the sprocket-wheels are keyed to the transverse shaft 33 and rotates imultaneously and prevent one end of the shaft from dropping below the other.

What I claim is—

1. The combination of a frame having vertical standards, a vertically-movable rotary load-receiver, the carriages arranged at opposite sides of the load-receiver and consisting of blocks, and upper and lower wheels arranged in pairs at opposite sides of the standards and located above and below the center of the load-receiver, and weights connected with the load-receiver, substantially as described.

2. The combination of a frame having opposite standards, a vertically-movable transverse shaft, a rotary load-receiver mounted on the shaft, the opposite carriages fixed to the shaft and consisting of blocks having openings to receive the shaft, and wheels arranged in pairs above and below the said shaft at the tops and bottoms of the blocks and located at the sides of the standards and adapted to run on the same, and weights connected with the load-receiver, substantially as described.

3. The combination of a frame provided at opposite sides with standards, a transverse shaft extending through the standards, a vertically-movable rotary load-receiver mounted on the shaft, scale-weights, flexible connections connected with the scale-weights and provided with hangers receiving the ends of the shaft and located beyond and spaced from the standards, the wheels 30 mounted on the hangers and projecting inwardly therefrom and located in the spaces between the same and the standards, the supplemental weights provided with projecting lugs, and the catches arranged to engage the lugs and provided with projecting portions to be engaged by the said wheels, substantially as described.

4. The combination with a frame provided with vertical standards, a transverse shaft extending through the standards, scale-weights connected with the shaft, the supplemental weights arranged on the exterior of the standards, the wheels projecting from the inner faces of the supplemental weights and arranged to run on the standards, the antifriction devices mounted on the standards and engaging the supplemental weights and holding the same in position, and means for supporting and tripping the supplemental weights, substantially as described.

5. The combination of a frame having standards, a transverse shaft, a vertically-movable rotary load-receiver mounted on the shaft, pulleys, flexible connections having hangers supporting the shaft, scale-weights attached to the flexible connections, the supplemental weights, the catches mounted on the frame and arranged to support the supplemental weights and provided with arms extending laterally beyond the standards, coiled springs connected with the arms for holding the catches in position for engaging the supplemental weights, and means for engaging the catches to release the supplemental weights, substantially as described.

6. The combination of a frame, a vertically-movable rotary load-receiver provided with partitions or divisions forming buckets and having slots at their outer edges, a supply-chute having sides extending into the load-receiver and arranged in the paths of the slots, an oscillating cut-off arranged at the bottom of the supply-chute and provided with means for actuating it to close it, a catch for holding the cut-off open, means operated by the load-receiver for opening the cut-off, and tripping mechanism for releasing the latter, substantially as described.

7. The combination of a frame, a vertically-movable rotary load-receiver provided with partitions or divisions forming buckets and having slots at their outer edges, a supply-chute having sides extending into the load-receiver and arranged in the paths of the slots, a movable cut-off arranged at the bottom of the supply-chute and adapted to close automatically when released, a catch for holding the cut-off open, means for opening the cut-off, and tripping mechanism for releasing the latter, substantially as described.

8. The combination of a load-receiver, a movable cut-off, a catch for holding the cut-off open, a shaft having an arm and provided with means for engaging the catch, a horizontally-disposed reciprocating bar engaging the arm of the shaft and adapted to partially rotate the same, a support receiving one end of the bar, a lever pivoted to and supporting the other end of the bar, and means for actuating the lever and for automatically disengaging the bar from the arm of the shaft, substantially as described.

9. The combination of a load-receiver, a movable cut-off, a catch for holding the cut-off open, a shaft having an arm and provided with means for engaging the catch, a reciprocating bar engaging the arm of the shaft and arranged on a suitable support and having an inclined edge for engaging the same, whereby the said bar will be automatically lifted out of engagement with the arm, and means for actuating the bar, substantially as described.

10. The combination of a frame, a load-receiver, a supply-chute, a movable cut-off, a catch arranged in the path of the cut-off and adapted to hold the same in its open position, a shaft having inner and outer arms, the inner arm being arranged to engage the catch, a bar arranged to engage the outer arm and arranged on a suitable support and having an inclined edge for engaging the same, whereby the said bar will be automatically lifted out of engagement with the outer arm, after the cut-off has been tripped, and means for actuating the said bar, substantially as described.

11. The combination of a frame, a vertically-movable load-receiver, scale-weights connected therewith, a supplemental weight, means for supporting and tripping the supplemental weight, a movable cut-off, a catch arranged in the path of the cut-off and adapted to hold the same open, a shaft having inner and outer arms, the inner arm being arranged to engage the catch to release the cut-off, a longitudinally-movable bar arranged to engage the outer arm, and connections between the bar and the supplemental weight, substantially as described.

12. The combination of a frame, a vertically-movable load-receiver, the supplemental and scale weights, a cut-off, a catch arranged to hold the cut-off open, a shaft having inner and outer arms, the inner arm being arranged to engage the catch to release the cut-off, the bar arranged to engage the outer arm and provided with an inclined edge arranged on a suitable support, whereby the bar is lifted out of engagement with the said outer arm, and a bell-crank connected with the bar and with the supplemental weight, substantially as described.

13. The combination of a frame, a vertically-movable load-receiver, supplemental and scale weights, a movable cut-off, a catch arranged to hold the cut-off open, a shaft having inner and outer arms, the inner arm being arranged to engage the catch, and the outer arm being provided with a shoulder, a bar having a shoulder for engaging that of the outer arm and provided with an inclined edge, a wheel receiving the bar at the inclined edge thereof, and a bell-crank connecting the bar with the supplemental weight, substantially as described.

14. The combination of a frame, a vertically-movable load-receiver, supplemental and scale weights, a cut-off, a bracket having an arm at the bottom, a catch movably mounted on the bracket at the top thereof and depending downward therefrom and supported by the arm in position for engaging the cut-off to hold the same open, and means for swinging the catch away from the arm to release the cut-off, substantially as described.

15. The combination of a frame, a movable cut-off provided with means for closing it, a rotary load-receiver, a lever arranged in the path of the load-receiver and adapted to be actuated by the same, and a bar connected with the lever and with the cut-off and adapted to close the latter and having a limited movement independently thereof to permit the cut-off to close quickly without actuating either the bar or the lever, substantially as and for the purpose described.

16. The combination of a frame, a movable cut-off provided with means for closing it, a rotary load-receiver provided at intervals with lugs or projections, a lever arranged in the path of the lugs or projections, and means for connecting the lever with the cut-off, whereby the latter will be opened when the lever is actuated by the said lugs or projections, said means permitting the cut-off to have a limited movement independently of the lever to close quickly without actuating the said lever, substantially as described.

17. The combination of a frame, a rotary load-receiver, a movable cut-off having means for closing it and provided with a projection, a bar having a slot or opening receiving the projection to permit the cut-off to close quickly without actuating the said bar, and a lever connected with the bar and arranged to be actuated by the load-receiver to open the cut-off, substantially as described.

18. The combination of a rotary load-receiver having beveled lugs or projections, a movable cut-off having a projection, a bar provided with a slot or opening receiving the projection of the cut-off to permit the latter to close quickly without actuating the bar, and a lever connected with the bar and arranged to be engaged by the beveled lugs or projections of the load-receiver, substantially as described.

19. The combination of a frame, a rotary load-receiver having a vertical movement, supplemental and scale weights, a movable cut-off, a catch arranged to hold the cut-off in its open position, a lever arranged to be engaged by the load-receiver and connected with the cut-off and adapted to open the same, and tripping mechanism actuated by the supplemental weight for releasing the cut-off, substantially as described.

20. The combination of a frame, a rotary load-receiver, supplemental and scale weights, an oscillatory cut-off provided with a weighted arm and having a pin or projection, a lever arranged to be engaged by the rotary load-receiver, a bar connected with the lever, and having a slot or opening receiving the pin or projection of the cut-off, a catch arranged for holding the cut-off open, and tripping mechanism for disengaging the catch from the cut-off, substantially as described.

21. The combination of a frame, a rotary load-receiver provided with peripheral cams forming shoulders, scale-weights, and the spring-actuated brake arranged to engage the cams to check the rotation of the load-receiver, and provided with a cushioned buffer for engaging the shoulders to prevent backward movement and to throw the load-receiver forward, substantially as described.

22. The combination of a frame, a rotary load-receiver provided with cams, a bracket having a pivot, a brake detachably mounted on the pivot, an adjusting device for limiting the movement of the brake, and a spring engaging the brake and interlocked with the same to retain the brake on the pivot of the bracket, substantially as described.

23. The combination of a frame, a rotary load-receiver having cams, a pivoted brake provided with a socket and having a cushioned buffer mounted therein, and a spring engaging the brake, substantially as described.

24. The combination of a frame, a rotary load-receiver having cams, a brake pivotally connected at one end to the frame, a spring secured to the frame and engaging the other end of the brake to force the same against the cams, and an adjusting device extending from the inner side of the brake and engaging the frame for limiting the movement of the brake, substantially as described.

25. The combination of a frame, a rotary load-receiver having cams, scale-weights, a bracket having a pivot, a brake detachably arranged on the pivot and having a head provided with opposite recesses, a wear-plate mounted in one of the recesses, and a spring secured to the frame and engaging the brake at the other recess, substantially as described.

26. The combination of a frame, a rotary load-receiver having projections, scale-weights, and the combined stop and buffer having a cushioning-spring and provided with a pivoted portion arranged to engage the projections of the load-receiver substantially as described.

27. The combination of a frame, a rotary load-receiver having projections having the combined stop and buffer comprising the pivoted member arranged to engage the stops, the slidingly-mounted rod, the spring connected with the rod and forming the cushion, and a spring-actuated link connected with the pivoted bar, substantially as described.

28. The combination of a frame, a rotary load-receiver having projections, and the combined stop and buffer comprising the substantially hook-shaped bar adapted to move upward and downward, a rod slidingly mounted and having the hook-shaped bar pivoted to it, a spring connected with the rod, a link or bar pivoted to the hook-shaped bar and having an opening, a pin or projection mounted on the frame and arranged in the said opening, and a spring connected with the pin or projection and with the link or bar, substantially as described.

In testimony that I claim the foregoing as my own I have hereto affixed my signature in the presence of two witnesses.

PEETE B. CLARKE.

Witnesses:
JOHN FRENCH,
HENRY H. GRAFF.